United States Patent [19]

Brown et al.

[11] Patent Number: 5,056,909
[45] Date of Patent: Oct. 15, 1991

[54] CONTACT LENS FOR COMPENSATING EYE DOMINANCE CROSSOVER

[76] Inventors: Hugh L. Brown, 12053 N. Ridge Rd., Mequon, 53092; Richard J. Stepniewski, Wauwatosa, both of Wis.

[21] Appl. No.: 599,140

[22] Filed: Oct. 17, 1990

Related U.S. Application Data

[62] Division of Ser. No. 405,649, Sep. 11, 1989.

[51] Int. Cl.$^5$ ................................................ G02C 7/04
[52] U.S. Cl. ...................................... 351/177; 351/162
[58] Field of Search ............... 351/160 R, 160 H, 161, 351/162, 177

[56] References Cited

FOREIGN PATENT DOCUMENTS 62926 7/1968 German Democratic Rep. ..................................... 351/162

Primary Examiner—Scott J. Sugarman
Attorney, Agent, or Firm—Fuller, Ryan & Hohenfeldt

[57] ABSTRACT

A contact lens has a central circular region treated to make it translucent. The diameter of the translucent region is at least great enough to cover the pupil of the eye. Light passes through the central region of the lens but the image normally seen is blurred sufficiently so that it cannot be visualized. The lens is deposited on the pupil of the eye which is normally dominant for those who have eye dominance crossover such that where critical viewing along the sights of a gun or optical instrument, for example, must be performed by the other eye, visual dominance is transferred to said other eye.

3 Claims, 1 Drawing Sheet

CONTACT LENS FOR COMPENSATING EYE DOMINANCE CROSSOVER

This is a divisional of copending application Ser. No. 07/405,649 filed on 9/11/89.

BACKGROUND OF THE INVENTION

This invention pertains to a contact lens which is adapted for compensating eye dominance crossover.

The especially adapted contact lens improves visual accuracy in connection with such activities as shooting with a rifle, shotgun, pistol or bowling or looking into the eyepiece of an optical instrument such as a telescope or microscope or a viewfinder.

U.S. Pat. No. 4,761,196 describes a method and means for adapting spectacles for overcoming the adverse affect of the lack of correlation between ones handedness and eye dominance. One common experience wherein the lack of correlation between eye dominance and hand dominance is in shooting. Rifles and shotguns, for example, are designed for use by the majority of the population which has right eye dominance and right handedness. Such shooters can look through the telescope or along the sights of a gun with the right eye while left eye is inactive except to the extent that it contributes to peripheral vision and depth perception. Another person whose left eye is dominant is obliged, by reason of the design of rifles and shotguns for right handedness and right eye dominance, to also site a target with the right eye. To overcome the conflict of the lack of correlation between eye and hand dominance, shooters who have crossover will close their left eye while sighting. This adversely affects their accuracy. The best accuracy by both right and left hand shooters is obtained when the shooter keeps both of his or her eyes open. Closing one eye results in loss of binocular vision, peripheral vision and depth perception. It is especially important for trap shooters to maintain peripheral vision since a shot when the moving clay pigeon or target comes into site. The image in a microscope, telescope or camera viewfinder is also perceived more closely if the eye opposite the one looking through the eyepiece is kept open.

It has also been established that closing one eye while letting the other do the work has adverse physiological effects. The capillary bed that supplies the retina tissue to which the optic nerve connects is beneath the retina so light does not have to pass through blood. When one eye is closed voluntarily or otherwise for a short time, the brain brings about events that reduce blood flow to both eyes and this reduces visual acuity of the eye that is open and doing the work. This is another good reason for keeping both eyes open when performing visual activities which require accuracy such as shooting or using optical instruments.

A simple test to determine which test is dominant involves holding a finger or a pencil, for example, vertical while the arm is fully extended and with both eyes aligning the pencil with a distant object. Then, the right eye can be closed. If, when the right eye is closed, the pencil appears to shift out of alignment with the distant object, it was the right eye that was doing most of the work all the time and there is right eye dominance. If, when the left eye is closed, the pencil appears to shift out of alignment with the distant object, it is the left eye that is doing most of the work and there is left eye dominance. Before the invention in U.S. Pat. No. 4,761,196 was made for helping those who had to wear eye defect corrective spectacles at least during shooting, the shooters would try to minimize their handicap by putting a black patch or tape over their dominant left eye so they could be more comfortable shooting with a weapon designed for use by the right eye dominant majority. U.S. Pat. No. 4,761,196 provides for adhering a translucent disk to the spectacle lens for the dominant eye while aiming a weapon or viewing through an optical instrument with the other non-dominant eye. The translucent disk is aligned with the pupil of the eye so that no target or image can be seen with the dominant eye but the brain, sensing that both eyes are exposed to light, reacts in such a way that the favorable effects of binocular vision, depth perception and peripheral vision are maintained. The invention disclosed herein provides the same benefits for those who can or do wear contact lenses rather than spectacles.

SUMMARY OF THE INVENTION

A primary objective of the invention disclosed herein is to aid those who have eye dominance crossover and who are involved in activities requiring high visual accuracy.

Briefly stated, the invention resides in making and providing a contact lens that is adapted for compensating eye dominance crossover. The new contact lens is basically like a conventional contact lens except that it has a circular central region which overlays the pupil and is translucent. This allows one who is sighting something with the other eye to keep the eye having the translucent central region open so that binocular vision, depth perception and peripheral vision are maintained.

A more detailed description of the specialized contact lens will now be set forth in reference to the drawing.

DESCRIPTION OF A PREFERRED EMBODIMENT

Figure 1:
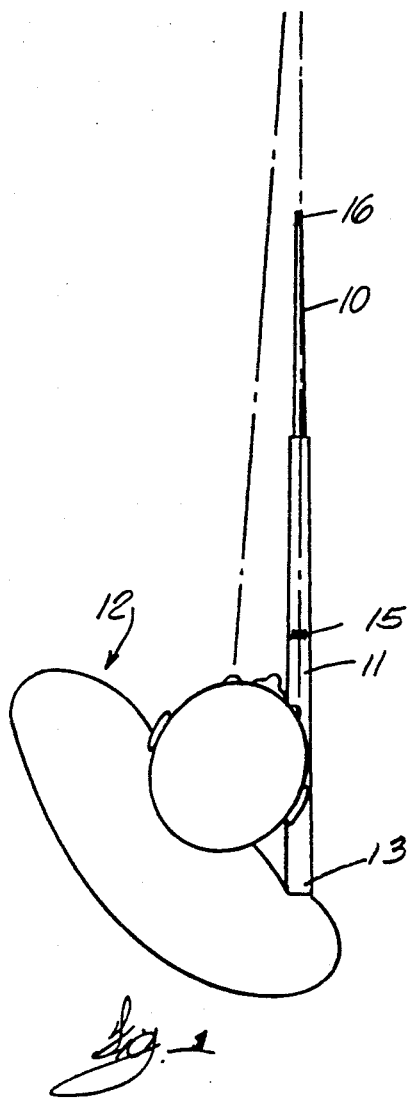
FIG. 1 is a plan diagrammatic view of an individual, such as a shooter, who may have a dominant left but is compelled to aim a gun using the right eye or who may simply be trying to aim with both eyes open.

FIG. 1 shows a diagram of a shooter who is holding a gun having a long barrel 10 such as a shotgun or a rifle. The stock 11 of the gun is on the right side of the shooter, who is identified by the numeral 12. The butt 13 of the gun stock is bearing on the right shoulder area of the shooter. The shooter has the specially adapted contact lens disposed over the pupil of his naturally non-dominant eye 14 which is aligned with the rear sight 15 and front sight 16 of the gun barrel. The shooter is involved in the task of sighting a distant object in line with rear sight 15 and front sight 16 of the gun. The shooter may be wearing safety glasses which ordinarily are not for correcting vision. This practice should be followed by all shooters.

Figure 2:
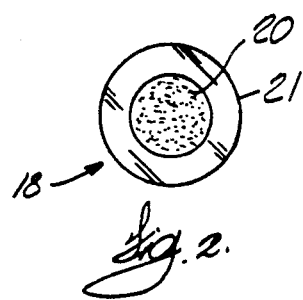
FIG. 2 is a frontal view of the new lens.

A plan view of the new specialized contact lens is depicted in FIG. 2 where it is generally designated by the numeral 18. Since it has been assumed that the shooter depicted in FIG. 1 is left eye dominant and is aiming with the right eye, the specially adapted contact lens 18 will be superposed over the pupil of the dominant left eye as depicted in FIG. 1. Shooters who are right eye dominant and sight with the right eye can also wear the new lens on the left non-dominant eye since this trains or improves their ability to keep both eyes open which is desirable. This applies viewing with other optical instruments too. The central translucent region 20 has a diameter of about 7.5 mm preferably. The annular region 21 surrounding the central area 20 is transparent. The overall diameter is about 11 mm.

Figure 3:
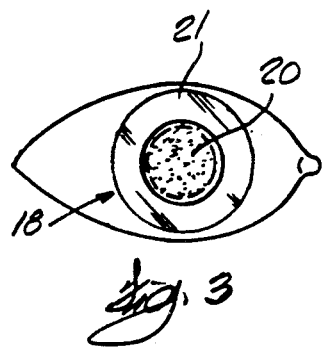
FIG. 3 shows the new contact lens applied to an eye.
Figure 4:
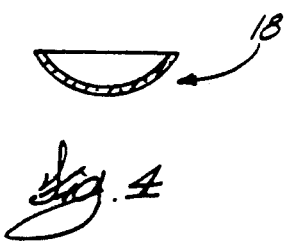
FIG. 4 is a cross sectional view of the lens.

In FIG. 3 the lens 18 is deposited on the eye with the translucent central region 20 superposed over the pupil and with the clear annular region 21 extending partially over the sclera of the eye. Except for the translucent central region of the lens, it is otherwise similar to conventional contact lenses and may be made from most if not all of the variety of materials out of which conventional contact lenses are made. By way of example, and not limitation, suitable lenses for investigational purposes have been made of a soft material known as Polymacon. The lens is basically concave-convex in cross section as in FIG. 4 but it is soft enough when made of this material to follow the contour of the eye.

There are a variety of ways in which the central circular region of the lens can be made translucent. A method known as spin casting is one of the methods. Another method involves masking the marginal region of the lens and shot blasting the central region of the lens. A fine, hard powder such as titanium dioxide has been found to be satisfactory. The central region can also be made translucent by means of a lathe operation. Casting in a mold that has a porous central region is another method that can be used.

The translucent region should have a diameter at least sufficient to cover the pupil of an adult eye with preferably one of the transparent marginal regions extending onto the sclera of the eye. Of course, the lens can be tinted if the wearer prefers. In any case, it is important that the central region of the lens allows light to enter the eye in the normal way but without the image being defined by the eye so that the dominancy of the eye on which the lens is placed is transferred to the other eye that is doing the critical visualization of a target or specimen.

Although a preferred embodiment of the invention has been described in detail, such description is intended to be illustrative rather than limiting for the invention may be variously embodied and is to be limited only by interpretation of the claims which follow.

We claim:

1. A method for compensating non-dominant eye crossover and for improving the accuracy of visualizing and aiming at an object or the image of an object sighted by a non-dominant eye and for facilitating keeping the other dominant eye open simultaneously to preserve peripheral vision and depth perception, comprising:

before undertaking to sight said object or image with said non-dominant eye, applying to said other dominant eye a contact lens having a circular optically diffusing translucent central region whose diameter is sufficient to cover the pupil of the eye and having a transparent annular region surrounding said central region, and positioning said translucent central region of the contact lens to completely cover the pupil and totally nullify visual acuity of said dominant eye.

2. The method according to claim 1 including selecting for applying to said dominant eye a said contact lens whose circular optically diffusing translucent central region has an outside diameter of substantially 7.5 mm.

3. The method according to claim 1 including selecting for applying to said dominant eye a said contact lens whose circular optically diffusing translucent central region has an outside diameter of substantially 7.5 mm and said transparent annular region of said lens surrounding said central region has a diameter of substantially 11 mm.

* * * * *